US00RE47321E

(19) United States
(12) Reissued Patent
Johnson et al.

(10) Patent Number: US RE47,321 E
(45) Date of Reissued Patent: Mar. 26, 2019

(54) BULK AMORPHOUS REFRACTORY GLASSES BASED ON THE NI(-CU-)-TI(-ZR)-AL ALLOY SYSTEM

(75) Inventors: William L. Johnson, Pasadena, CA (US); Donghua Xu, Knoxville, TN (US)

(73) Assignee: California Institute of Technology, Pasadena, CA (US)

(21) Appl. No.: 13/240,516

(22) Filed: Sep. 22, 2011

Related U.S. Patent Documents

Reissue of:
(64) Patent No.: 7,591,910
Issued: Sep. 22, 2009
Appl. No.: 10/535,317
PCT Filed: Dec. 4, 2003
PCT No.: PCT/US03/38683
§ 371 (c)(1),
(2), (4) Date: Feb. 3, 2006
PCT Pub. No.: WO2004/050930
PCT Pub. Date: Jun. 17, 2004

(51) Int. Cl.
*C22C 45/04* (2006.01)
*C22C 19/03* (2006.01)
*C22C 1/00* (2006.01)

(52) U.S. Cl.
CPC ..... *C22C 45/04* (2013.01); *C22C 1/002* (2013.01)

(58) Field of Classification Search
CPC ..... C22C 45/04; C22C 1/00
USPC ..... 148/403, 429; 420/457, 460
See application file for complete search history.

(56) References Cited

U.S. PATENT DOCUMENTS

| | | | | |
|---|---|---|---|---|
| 2,106,145 | A | ‡ | 4/1938 | Floraday |
| 2,124,538 | A | ‡ | 7/1938 | Boyer |
| 3,322,546 | A | ‡ | 5/1967 | Tanzman et al. |
| 3,539,192 | A | ‡ | 11/1970 | Prasse |
| 3,776,297 | A | ‡ | 12/1973 | Williford et al. |
| 3,948,613 | A | ‡ | 4/1976 | Weill |
| 3,970,445 | A | ‡ | 7/1976 | Gale et al. |
| 3,986,867 | A | ‡ | 10/1976 | Masumoto et al. |
| 3,986,892 | A | ‡ | 10/1976 | Eve et al. |
| 4,024,902 | A | ‡ | 5/1977 | Baum |
| 4,067,732 | A | ‡ | 1/1978 | Ray |
| 4,124,472 | A | ‡ | 11/1978 | Riegert |
| 4,125,737 | A | ‡ | 11/1978 | Andersson |
| 4,163,071 | A | ‡ | 7/1979 | Weatherly et al. |

(Continued)

FOREIGN PATENT DOCUMENTS

| | | | |
|---|---|---|---|
| CN | 1354274 | * | 6/2002 |
| DE | 010237992 | | 3/2003 |

(Continued)

OTHER PUBLICATIONS

Author Unknown, "Standard Practice for Conducting Dry Sand/Rubber Wheel Abrasion Tests," Designation G65-81, source unknown, pp. 351-368.

(Continued)

*Primary Examiner* — Sean E Vincent
(74) *Attorney, Agent, or Firm* — Brownstein Hyatt Farber Schreck, LLP

(57) ABSTRACT

Bulk amorphous alloys based on quaternary Ni—Zr—Ti—Al alloy system, and the extension of this quaternary system to higher order alloys by the addition of one or more alloying elements, methods of casting such alloys, and articles made of such alloys are provided.

20 Claims, 2 Drawing Sheets

(56) References Cited

U.S. PATENT DOCUMENTS

| | | | | | |
|---|---|---|---|---|---|
| 4,260,416 | A | ‡ | 4/1981 | Kavesh et al. | |
| 4,268,567 | A | ‡ | 5/1981 | Harmony | |
| 4,330,027 | A | ‡ | 5/1982 | Narasimhan | |
| 4,374,900 | A | ‡ | 2/1983 | Hara et al. | |
| 4,381,943 | A | ‡ | 5/1983 | Dickson et al. | |
| 4,396,820 | A | ‡ | 8/1983 | Puschner | |
| 4,409,296 | A | | 10/1983 | Ward | |
| 4,437,912 | A | * | 3/1984 | Sakakima et al. | 148/403 |
| 4,482,612 | A | | 11/1984 | Kuroki et al. | |
| 4,487,630 | A | | 12/1984 | Crook et al. | |
| 4,488,882 | A | | 12/1984 | Dausinger et al. | |
| 4,499,158 | A | | 2/1985 | Onuma et al. | |
| 4,515,870 | A | | 5/1985 | Bose et al. | |
| 4,523,625 | A | | 6/1985 | Ast | |
| 4,526,618 | A | | 7/1985 | Keshavan et al. | |
| 4,557,981 | A | | 12/1985 | Bergmann | |
| 4,564,396 | A | | 1/1986 | Johnson et al. | |
| 4,585,617 | A | | 4/1986 | Tenhover et al. | |
| 4,612,059 | A | | 9/1986 | Mori et al. | |
| 4,656,099 | A | | 4/1987 | Sievers | |
| 4,668,310 | A | | 5/1987 | Kudo et al. | |
| 4,725,512 | A | | 2/1988 | Scruggs | |
| 4,731,253 | A | | 3/1988 | DuBois | |
| 4,741,974 | A | | 5/1988 | Longo et al. | |
| 4,770,701 | A | | 9/1988 | Henderson et al. | |
| 4,810,850 | A | | 3/1989 | Tenkula et al. | |
| 4,960,643 | A | | 10/1990 | Lemelson | |
| 5,127,969 | A | | 7/1992 | Sekhar | |
| 5,189,252 | A | | 2/1993 | Huffman et al. | |
| 5,288,344 | A | | 2/1994 | Peker et al. | 148/403 |
| 5,294,462 | A | | 3/1994 | Kaiser et al. | |
| 5,368,659 | A | | 11/1994 | Peker et al. | |
| 5,380,349 | A | | 1/1995 | Taniguchi et al. | |
| 5,440,995 | A | | 8/1995 | Levitt | |
| 5,482,577 | A | | 1/1996 | Hashimoto et al. | |
| 5,567,251 | A | | 10/1996 | Peker et al. | |
| 5,567,532 | A | | 10/1996 | Peker et al. | |
| 5,735,975 | A | | 4/1998 | Lin et al. | |
| 6,010,580 | A | | 1/2000 | Dandliker et al. | |
| 6,183,889 | B1 | | 2/2001 | Koshiba et al. | |
| 6,218,029 | B1 | | 4/2001 | Rickerby | |
| 6,325,868 | B1 | * | 12/2001 | Kim et al. | 148/403 |
| 6,326,295 | B1 | | 12/2001 | Figura | |
| 6,447,550 | B1 | | 9/2002 | Hunter et al. | |
| 6,521,058 | B1 | * | 2/2003 | Inoue et al. | 148/403 |
| 6,585,772 | B2 | | 7/2003 | Hunter et al. | |
| 7,473,278 | B2 | | 1/2009 | Hunter et al. | |
| 7,582,117 | B2 | | 9/2009 | Hunter et al. | |
| 7,896,926 | B2 | | 3/2011 | Hunter et al. | |
| 7,968,209 | B2 | | 6/2011 | Pawar et al. | |
| 8,556,987 | B2 | | 10/2013 | Hunter et al. | |
| 2002/0003013 | A1 | * | 1/2002 | Hays | 148/561 |
| 2002/0036034 | A1 | | 3/2002 | Xing et al. | 148/561 |
| 2003/0140987 | A1 | * | 7/2003 | Bae et al. | 148/403 |
| 2006/0231169 | A1 | * | 10/2006 | Park et al. | 148/403 |
| 2006/0237105 | A1 | * | 10/2006 | Yim et al. | 148/403 |

FOREIGN PATENT DOCUMENTS

| | | | | |
|---|---|---|---|---|
| DE | 010237992 | A1 | | 3/2003 |
| GB | 2005302 | | | 4/1979 |
| JP | 56-112449 | | | 9/1981 |
| TW | 458828 | | * | 10/2001 |
| WO | WO 00/068469 | | | 11/2000 |
| WO | WO00/68469 | A2 | | 11/2000 |
| WO | WO 03/040422 | | | 5/2003 |
| WO | WO03/040422 | A1 | | 5/2003 |

OTHER PUBLICATIONS

T.G. Park, Development of new Ni-based amorphous alloys containing no metalloid that have large undercooled liquid regions, Scripta mater 43. (2000). p. 109-114.*

M.H. Lee et al. Quaternary and quinary Ni-based amorphous alloys in the 3Ni—Zr—Ti—X (X=Al,Si,P) and Ni—Zr—Ti—Si—Y (Y=Sn, Mo, Y) systems. Mat. Res. Soc. Symp. Proc., vol. 644, (2001) L.4.8.1-L4.8.6.*

* cited by examiner
‡ imported from a related application

BULK AMORPHOUS REFRACTORY GLASSES BASED ON THE NI(-CU-)-TI(-ZR)-AL ALLOY SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*STATEMENT REGARDING FEDERALLY SPONSORED RESEARCH OR DEVELOPMENT*

*The U.S. Government has certain rights in this invention pursuant to Grant No. DAAD 19-01-1-0525 awarded by the United States Army Research Office.*

*This application claims the benefit of PCT/US2003/38683, filed Dec. 4, 2003, published as PCT Publication No. WO2004/050930, and provisional application No. 60/430,847 filed Dec. 4, 2002.*

FIELD OF THE INVENTION

The present invention is directed to novel bulk solidifying amorphous alloy compositions, and more specifically to Ni-base bulk solidifying amorphous alloy compositions.

BACKGROUND OF THE INVENTION

Amorphous alloys (or glassy alloys or metallic glass alloys) have typically been prepared by rapid quenching a molten material from above the melt temperature to ambient temperature. Generally, cooling rates of $10^{5}$° C./sec have been employed to achieve an amorphous structure in these materials. However, at such high cooling rates, the heat cannot be extracted from thick sections of such materials, and, as such, the thickness of articles made from amorphous alloys has been limited to tens of micrometers in at least in one dimension. This limiting dimension is generally referred to as the critical casting thickness and can be related by heat-flow calculations to the cooling rate (or critical cooling rate) required to form the amorphous phase.

This critical thickness (or critical cooling rate) can also be used as a measure of the processability of an amorphous alloy (or glass forming ability of an alloy). Until the early nineties, the processability of amorphous alloys was quite limited and amorphous alloys were readily available only in powder form or in very thin foils or strips with dimensions of less than 100 micrometers.

However, in the early nineties, a new class of amorphous alloys was developed that was based mostly on Zr and Ti alloy systems. It was observed that these families of alloys have much lower critical cooling rates of less than $10^{3}$° C./sec, and in some cases as low as 10° C./sec. Using these new alloys it was possible to form articles of amorphous alloys having critical casting thicknesses from about 1.0 mm to as large as about 20 mm. As such, these alloys are readily cast and shaped into three-dimensional objects using conventional methods such as metal mold casting, die casting, and injection casting, and are generally referred to as bulk-solidifying amorphous alloys (bulk amorphous alloys or bulk glass forming alloys). Examples of such bulk amorphous alloys have been found in the Zr—Ti—Ni—Cu—Be, Zr—Ti—Ni—Cu—Al, Mg—Y—Ni—Cu, La—Ni—Cu—Al, and Fe-based alloy families. These amorphous alloys exhibit high strength, a high elastic strain limit, high fracture toughness, and other useful mechanical properties, which are attractive for many engineering applications.

Although a number of different bulk-solidifying amorphous alloy formulations have been disclosed in the past, it is still desirable to seek alloy compositions with higher temperature stability, better corrosion resistance, higher processability, higher and modulus, higher specific strength and modulus, and lower raw material cost. Accordingly, a need exists to develop novel compositions of bulk solidifying amorphous alloys which will provide improvements in these properties and characteristics.

SUMMARY OF THE INVENTION

The present invention is directed to Ni-base bulk-solidifying amorphous alloys, and particularly to alloys based on the Ni—Zr—Ti—Al quaternary system.

In one exemplary embodiment, the Ni—Zr—Ti—Al quaternary system is extended to higher alloys by adding one or more alloying elements.

In another embodiment, the invention is directed to methods of casting these alloys into three-dimensional bulk objects, while retaining a substantially amorphous atomic structure. In such an embodiment, the term three dimensional refers to an object having dimensions of least 0.5 mm in each dimension, and preferably 1.0 mm in each dimension. The term "substantially" as used herein in reference to the amorphous metal alloy means that the metal alloys are at least fifty percent amorphous by volume. Preferably the metal alloy is at least ninety-five percent amorphous, and most preferably about one hundred percent amorphous by volume.

BRIEF DESCRIPTION OF THE DRAWINGS

These and other features and advantages of the present invention will be better understood by reference to the following detailed description when considered in conjunction with the accompanying drawings wherein.

DESCRIPTION OF THE INVENTION

Figure 1A:
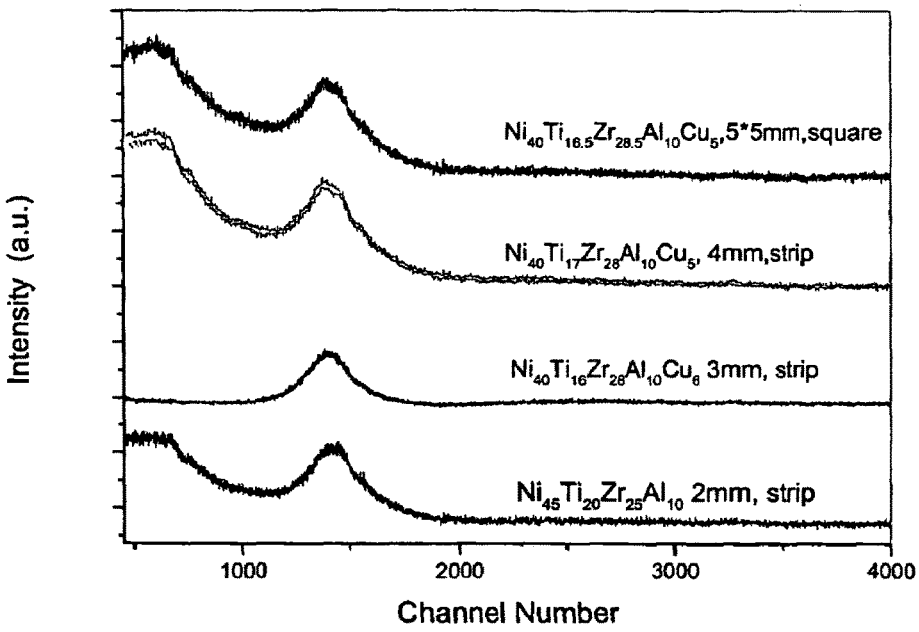
FIG. 1a is a graphical depiction of x-ray diffraction scans of an exemplary bulk amorphous alloy.

The present invention is directed to bulk-solidifying amorphous alloys based on a Ni—Zr—Ti—Al quaternary system, and the extension of this ternary system to higher order alloys by the addition of one or more alloying elements. These alloys are referred to as Ni-based alloys herein.

Although a number of different Ni—Zr—Ti—Al combinations may be utilized in the Ni-based alloys of the current invention, a range of Ni content from about 27 to 58 atomic percentage, a range of Ti content from about 8 to 22 atomic percentage, a range of Zr content from about 13 to about 37 atomic percent, and a range of Al content from about 5 to about 17 atomic percent are preferably utilized.

To increase the ease of casting such alloys into larger bulk objects, and for increased processability, a formulation having a range of Ni content from about 37 to 49 atomic percentage, a range of Ti content from about 13 to 20 atomic percentage, a range of Zr content from about 25 to about 32 atomic percent, and a range of Al content from about 8 to about 12 atomic percent is preferred. Still more preferable is a Ni-based alloy having a range of Ni content from about 39 to 47 atomic percentage, a range of Ti content from about 15 to 18 atomic percentage, a range of Zr content from about 27 to about 30 atomic percent, and a range of Al content from about 9 to about 11 atomic percent.

Although only combinations of Ni, Ti, Zr and Al have been discussed thus far, it should be understood that other elements can be added to improve the ease of casting the Ni-based alloys of the invention into larger bulk objects or to increase the processability of the alloys. Additional alloying elements of potential interest are Cu, Co, Fe, and Mn, which can each be used as fractional replacements for Ni; Hf, Nb, Ta, V, Cr, Mo and W, which can be used as fractional replacements for Zr and Ti; and Si, Sn, Ge, B, and Sb, which can be used as fractional replacements for Al.

It should be understood that the addition of the above mentioned additive alloying elements may have a varying degree of effectiveness for improving the processability of the Ni-base alloys in the spectrum of compositional ranges described above and below, and that this should not be taken as a limitation of the current invention.

Given the above discussion, in general, the Ni-base alloys of the current invention can be expressed by the following general formula (where a, b, c are in atomic percentages and x, y, z are in fractions of whole):

$$(Ni_{1-x}TM_x)_a((Ti,Zr)_{1-y}ETM_y)_b(Al_{1-z}AM_z)_c,$$

where a is in the range of from 27 to 58, b in the range of 21 to 59, c is in the range of 5 to 17 in atomic percentages; ETM is an early transition metal selected from the group of Hf; Nb, Ta, V, Cr, Mo, and W, and preferably from the group of Hf and Nb; TM is a transition metal selected from the group of Mn, Fe, Co, and Cu, and preferably from the group of Cu and Co; and AM is an additive material selected from the group of Si, Sn, Ge, B, and Sb, and preferably from the group of Si and Sn. In such an embodiment the following constraints are given for the x, y and z fraction: x is less than 0.3, y is less than 0.3, z is less than 0.3, and the sum of x, y and z is less than about 0.5, and under the further constraint that the content of Ti content is more than 8 atomic percent and Zr content is more than 13 atomic percent.

Preferably, the Ni-based alloys of the current invention are given by the formula:

$$(Ni_{1-x}TM_x)_a((Ti,Zr)_{1-y}ETM_y)_b(Al_{1-z}AM_z)_c,$$

where a is in the range of from 37 to 49, b in the range of 38 to 52, c is in the range of 8 to 12 in atomic percentages; ETM is an early transition metal selected from the group of Hf, Nb, Ta, V, Cr, Mo, and W, and preferably from the group of Hf and Nb; TM is a transition metal selected from the group of Mn, Fe, Co, and Cu, and preferably from the group of Cu and Co; and AM is an additive material selected from the group of Si, Sn, Ge, B, and Sb, and preferably from the group of Si and Sn. In such an embodiment the following constraints are given for the x, y and z fraction: x is less than 0.2, y is less than 0.2, z is less than 0.2, and the sum of x, y and z is less than about 0.3, and under the further constraint that the content of Ti content is more than 13 atomic percent and Zr content is more than 25 atomic percent.

Still more preferably, the Ni-based alloys of the current invention are given by the formula:

$$(Ni_{1-x}TM_x)_a((Ti,Zr)_{1-y}ETM_y)_b(Al_{1-z}AM_z)_c,$$

where a is in the range of from 39 to 47, b in the range of 42 to 48, c is in the range of 9 to 11 in atomic percentages; ETM is an early transition metal selected from the group of Hf, Nb, Ta, V, Cr, Mo, and W and preferably from the group of Hf and Nb; TM is a transition metal selected from the group of Mn, Fe, Co, and Cu and preferably from the group of Cu and Co; and AM is an additive material selected from the group of Si, Sn, Ge, B, and Sb and preferably from the group of Si and Sn. In such an embodiment the following constraints are given for the x, y and z fraction: x is less than 0.1, y is less than 0.1, z is less than 0.1, and the sum of x, y and z is less than about 0.2 and under the further constraint that the content of Ti content is more than 15 atomic percent and Zr content is more than 27 atomic percent.

For increased processability, the above mentioned alloys are preferably selected to have five or more elemental components. It should be understood that the addition of the above mentioned additive alloying elements may have a varying degree of effectiveness for improving the processability within the spectrum of the alloy compositional ranges described above and below, and that this should not be taken as a limitation of the current invention.

Other alloying elements can also be added, generally without any significant effect on processability when their total amount is limited to less than 2%. However, a higher amount of other elements can cause a degradation in the processability of the alloys, an d in particular when compared to the processability of the exemplary alloy compositions described below. In limited and specific cases, the addition of other alloying elements may improve the processability of alloy compositions with marginal critical casting thicknesses of less than 1.0 mm. It should be understood that such alloy compositions are also included in the current invention.

Exemplary embodiments of the Ni-based alloys in accordance with the invention are described in the following:

In one exemplary embodiment of the invention the Ni-based alloys have the following general formula:

$$Ni_{100-a-b-c}Ti_aZr_bAl_c,$$

where $8<a<22$, $13<b<37$, $5<c<17$.

In one preferred embodiment of the invention the Ni-based alloys have the following general formula $$Ni_{100-a-b-c}Ti_aZr_bAl_c,$$

where $13<a<20$, $25<b<32$, $8<c<12$.

The most preferred embodiment of the ternary Ni-based alloys have the following general formula $$Ni_{100-a-b-c}Ti_aZr_bAl_c,$$

where $15<a<18$, $27<b<30$, $9<c<11$.

Although higher order combinations of Ni-base alloys with five or more elemental components can be utilized in the current invention, in one particularly exemplary embodiment of the invention, the five component alloy system comprises combinations of Ni—Ti—Zr—Al—Cu, where the Ni content is from about 27 to 47 atomic percentage, the Ti content is from about 8 to 22 atomic percentage, the Zr content is from about 13 to about 37 atomic percent, the Cu content is up to 17 atomic percent, and the Al content is from about 5 to about 17 atomic percent.

To increase the ease of casting such alloys into larger bulk objects, and for increased processability, a formulation having a range of Ni content from about 37 to 44 atomic percentage, a range of Ti content from about 13 to 20 atomic percentage, a range of Zr content from about 25 to about 32 atomic percent, a range of Cu content from about 2 to 8 atomic percentage, and a range of Al content from about 8 to about 12 atomic percent is preferred. Still more preferable is a Ni-based alloy having a range of Ni content from about 39 to 42 atomic percentage, a range of Ti content from about 15 to 18 atomic percentage, a range of Zr content from about 27 to about 30 atomic percent, a range of Cu content from about 3 to about 7 atomic percent and a range of Al content from about 9 to about 11 atomic percent.

It should be understood that other elements can be added to improve the ease of casting the five component Ni-based alloys of the invention into larger bulk objects or to increase the processability of the alloys. Additional alloying elements of potential interest are Co, Fe, and Mn, which can each be used as fractional replacements for Ni and Cu moiety; Hf; Nb, Ta, V, Cr, Mo and W, which can be used as fractional replacements for Zr and Ti moiety; and Si, Sn, Ge, B, and Sb, which can be used as fractional replacements for Al.

It should be understood that the addition of the above mentioned additive alloying elements may have a varying degree of effectiveness for improving the processability of the Ni-base alloys in the spectrum of compositional ranges described above and below, and that this should not be taken as a limitation of the current invention.

Given the above discussion, in general, the Ni-base alloys based on the Ni—T—Zr—Cu—Al combination can be expressed by the following general formula (where a, b, c are in atomic percentages and x, y, z are in fractions of whole):

$$((\text{Ni Cu})_{1-x}\text{TM}_x)_a((\text{Ti,Zr})_{1-y}\text{ETM}_y)_b(\text{Al}_{1-z}\text{AM}_z)_c,$$

where a is in the range of from 27 to 58, b in the range of 21 to 59, c is in the range of 5 to 17 in atomic percentages; ETM is an early transition metal selected from the group of Hf, Nb, Ta, V, Cr, Mo, and W, and preferably from the group of Hf and Nb; TM is a transition metal selected from the group of Mn, Fe, and Co, and preferably Co; and AM is an additive material selected from the group of Si, Sn, Ge, B, and Sb, and preferably from the group of Si and Sn. In such an embodiment the following constraints are given for the x, y and z fraction: x is less than 0.3, y is less than 0.3, z is less than 0.3, and the sum of x, y and z is less than about 0.5, and under the further constraint that the content of Ti content is more than 8 atomic percent, Zr content is more than 13 atomic percent and Cu content is less than 17 atomic percent.

Preferably, the Ni-based alloys of the current invention are given by the formula:

$$((\text{Ni,Cu})_{1-x}\text{TM}_x)_a((\text{Ti,Zr})_{1-y}\text{ETM}_y)_b(\text{Al}_{1-z}\text{AM}_z)_c,$$

where a is in the range of from 37 to 49, b in the range of 38 to 52, c is in the range of 8 to 12 in atomic percentages; ETM is an early transition metal selected from the group of Hf, Nb, Ta, V, Cr, Mo, and W, and preferably from the group of Hf and Nb; TM is a transition metal selected from the group of Mn, Fe, and Co, and preferably Co; and AM is an additive material selected from the group of Si, Sn, Ge, B, and Sb, and preferably from the group of Si and Sn. In such an embodiment the following constraints are given for the x, y and z fraction: x is less than 0.2, y is less than 0.2, z is less than 0.2, and the sum of x, y and z is less than about 0.3, and under the further constraint that the content of Ti content is more than 13 atomic percent, Zr content is more than 25 atomic percent, and Cu content is from about 2 to 8 atomic percentage Still more preferably, the Ni-based alloys of the current invention are given by the formula:

$$((\text{Ni,Cu})_{1-x}\text{TM}_x)_a((\text{Ti,Zr})_{1-y}\text{ETM}_y)_b(\text{Al}_{1-z}\text{AM}_z)_c,$$

where a is in the range of from 39 to 47, bin the range of 42 to 48, c is in the range of 9 to 11 in atomic percentages; ETM is an early transition metal selected from the group of Hf, Nb, Ta, V, Cr, Mo, and W, and preferably from the group of Hf and Nb; TM is a transition metal selected from the group of Mn, Fe, and Co, and preferably Co; and AM is an additive material selected from the group of Si, Sn, Ge, B, and Sb, and preferably from the group of Si and Sn. In such an embodiment the following constraints are given for the x, y and z fraction: x is less than 0.1, y is less than 0.1, z is less than 0.1, and the sum of x, y and z is less than about 0.2, and under the further constraint that the content of Ti content is more than 15 atomic percent, Zr content is more than 27 atomic percent, and Cu content is from about 3 to 7 atomic percentage.

Other alloying elements can also be added, generally without any significant effect on processability when their total amount is limited to less than 2%. However, a higher amount of other elements can cause a degradation in the processability of the alloys, an particularly when compared to the processability of the exemplary alloy compositions described below. In limited and specific cases, the addition of other alloying elements may improve the processability of alloy compositions with marginal critical casting thicknesses of less than 1.0 mm. It should be understood that such alloy compositions are also included in the current invention.

Exemplary embodiments of the Ni-based alloys in accordance with the invention are described in the following examples:

In one exemplary embodiment of the invention the Ni-based alloys have the following general formula $$\text{Ni}_{100-a-b-c-d}\text{Ti}_a\text{Zr}_b\text{Al}_c\text{Cu}_d,$$

where $8<a<22$, $13<b<37$, $5<c<17$, and $0<d<17$.

In one preferred embodiment of the invention the Ni-based alloys have the following general formula $$\text{Ni}_{100-a-b-c-d}\text{Ti}_a\text{Zr}_b\text{Al}_c\text{Cu}_d,$$

where $13<a<20$, $25<b<32$, $8<c<12$, and $2<d<8$.

The most preferred embodiment of the pentiary Ni-base alloys have the following general formula $$\text{Ni}_{100-a-b-c-d}\text{Ti}_a\text{Zr}_b\text{Al}_c\text{Cu}_d,$$

where $15<a<18$, $27<b<30$, $9<c<11$, and $3<d<7$.

Alloys with these general formulations have been cast directly from the melt into copper molds to form fully amorphous strips or rods of thickness up to 6 mm. Examples of these bulk metallic glass forming alloys are given in Table 1, below.

TABLE 1

| Alloy Composition (at %) | Critical Casting Thickness (mm) |
|---|---|
| $Ni_{45}Ti_{20}Zr_{25}Al_{10}$ | 2 |
| $Ni_{45}Ti_{20}Zr_{20}Al_{10}Hf_5$ | 2 |
| $Ni_{32.5}Ti_{12.5}Zr_{32.5}Al_{10}Cu_{12.5}$ | 3 |
| $Ni_{33}Ti_{13}Zr_{32}Al_{10}Cu_{12}$ | 3 |
| $Ni_{37}Ti_{18}Zr_{29}Al_{10}Cu_6$ | 3 |
| $Ni_{40}Ti_{16}Zr_{23}Al_{10}Cu_6Hf_5$ | 3 |
| $Ni_{40}Ti_{16}Zr_{28}Al_{11}Cu_5$ | 3 |
| $Ni_{40}Ti_{18}Zr_{26}Al_{10}Cu_6$ | 3 |
| $Ni_{35}Ti_{14}Zr_{31}Al_{10}Cu_{10}$ | 4 |
| $Ni_{37}Ti_{15}Zr_{30}Al_{10}Cu_8$ | 4 |
| $Ni_{39}Ti_{18}Zr_{29}Al_{10}Cu_4$ | 4 |
| $Ni_{39.6}Ti_{15.84}Zr_{27.72}Al_{9.9}Cu_{5.94}Si_1$ | 4 |
| $Ni_{40}Ti_{16}Zr_{28}Al_{10}Cu_6$ | 4 |
| $Ni_{40.5}Ti_{16.2}Zr_{28.3}Al_{10}Cu_5$ | 4 |
| $Ni_{41}Ti_{16}Zr_{28}Al_{10}Cu_5$ | 4 |
| $Ni_{41.5}Ti_{18}Zr_{27}Al_{10}Cu_{3.5}$ | 4 |
| $Ni_{42}Ti_{15}Zr_{28}Al_{10}Cu_5$ | 4 |
| $Ni_{43}Ti_{19}Zr_{26}Al_{10}Cu_2$ | 4 |
| $Ni_{38.7}Ti_{17.2}Zr_{29.8}Al_{10}Cu_{4.3}$ | 5 |
| $Ni_{39}Ti_{17}Zr_{29}Al_{10}Cu_5$ | 5 |
| $Ni_{39}Ti_{17.5}Zr_{28.5}Al_{10}Cu_5$ | 5 |
| $Ni_{39.6}Ti_{16.9}Zr_{29.1}Al_{10}Cu_{4.4}$ | 5 |
| $Ni_{40}Ti_{16}Zr_{29}Al_{10}Cu_5$ | 5 |
| $Ni_{40}Ti_{17}Zr_{28}Al_{10}Cu_5$ | 5 |
| $Ni_{40}Ti_{17}Zr_{29}Al_{10}Cu_4$ | 5 |
| $Ni_{40}Ti_{17.5}Zr_{28.5}Al_{10}Cu_4$ | 5 |
| $Ni_{40.5}Ti_{16.5}Zr_{28}Al_{10}Cu_5$ | 5 |
| $Ni_{40.5}Ti_{16.75}Zr_{28.25}Al_{10}Cu_{4.5}$ | 5 |
| $Ni_{40.5}Ti_{17}Zr_{28.5}Al_{10}Cu_4$ | 5 |
| $Ni_{41}Ti_{17}Zr_{28}Al_{10}Cu_4$ | 5 |
| $Ni_{41}Ti_{17.5}Zr_{27.5}Al_{10}Cu_4$ | 5 |

TABLE 1-continued

| Alloy Composition (at %) | Critical Casting Thickness (mm) |
|---|---|
| $Ni_{41.5}Ti_{17.5}Zr_{27.5}Al_{10}Cu_{3.5}$ | 5 |
| $Ni_{39}Ti_{16}Zr_{29}Al_{10}Cu_{6}$ | 6 |
| $Ni_{39}Ti_{16.5}Zr_{28.5}Al_{10}Cu_{6}$ | 6 |
| $Ni_{39.8}Ti_{15.92}Zr_{27.86}Al_{9.95}Cu_{5.97}Si_{0.5}$ | 6 |
| $Ni_{39.8}Ti_{16.42}Zr_{28.36}Al_{9.95}Cu_{5.97}Si_{0.5}$ | 6 |
| $Ni_{39.8}Ti_{16.42}Zr_{28.36}Al_{9.95}Cu_{4.97}Ge_{1}$ | 6 |
| $Ni_{40}Ti_{16.5}Zr_{28.5}Al_{10}Cu_{5}$ | 6 |
| $Ni_{40}Ti_{16.5}Zr_{28.5}Al_{10}Cu_{4.5}Si_{0.5}$ | 6 |
| $Ni_{40}Ti_{17}Zr_{28.5}Al_{10}Cu_{4.5}$ | 6 |
| $Ni_{40}Ti_{17}Zr_{28}Al_{10}Cu_{4.5}Si_{0.5}$ | 6 |
| $Ni_{40.25}Ti_{16.5}Zr_{28.5}Al_{10}Cu_{4.75}$ | 6 |
| $Ni_{40.3}Ti_{16.42}Zr_{28.35}Al_{9.95}Cu_{4.48}Si_{0.5}$ | 6 |
| $Ni_{40.4}Ti_{16.46}Zr_{28.43}Al_{9.97}Cu_{4.49}Si_{0.3}$ | 6 |
| $Ni_{40.5}Ti_{16.25}Zr_{28.75}Al_{10}Cu_{4.5}$ | 6 |
| $Ni_{40.5}Ti_{16.5}Zr_{28.5}Al_{10}Cu_{4.5}$ | 6 |
| $Ni_{40.5}Ti_{16.5}Zr_{28.5}Al_{10}Cu_{4}Sn_{1}$ | 6 |
| $Ni_{40.5}Ti_{17}Zr_{28}Al_{10}Cu_{4.5}$ | 6 |
| $Ni_{40.75}Ti_{16.5}Zr_{28.5}Al_{10}Cu_{4.25}$ | 6 |
| $Ni_{41}Ti_{16.5}Zr_{28.5}Al_{10}Cu_{4}$ | 6 |
| $Ni_{41}Ti_{17}Zr_{28}Al_{10}Cu_{5}$ | 6 |

The above table gives the maximum thickness for which fully amorphous strips are obtained by metal mold casting using this exemplary formulation. Evidence of the amorphous nature of the cast strips can be determined by x-ray diffraction spectra. Typical x-ray diffraction spectra for fully amorphous alloy strips is provided in FIG. 1a.

The invention is also directed to methods of casting these alloys into three-dimensional bulk objects, while retaining a substantially amorphous atomic structure. In such an embodiment, the term three dimensional refers to an object having dimensions of least 0.5 mm in each dimension. The term "substantially" as used herein in reference to the amorphous alloy (or glassy alloy) means that the metal alloys are at least fifty percent amorphous by volume. Preferably the metal alloy is at least ninety-five percent amorphous and most preferably about one hundred percent amorphous by volume.

In general, crystalline precipitates in bulk amorphous alloys are highly detrimental to their properties, especially to the toughness and strength, and as such generally preferred to a minimum volume fraction possible. However, there are cases in which, ductile crystalline phases precipitate in-situ during the processing of bulk amorphous alloys forming a mixture of amorphous and crystalline phases, which are indeed beneficial to the properties of bulk amorphous alloys especially to the toughness and ductility. These cases of mixed-phase alloys, where such beneficial precipitates co-exist with amorphous phase are also included in the current invention. In one preferred embodiment of the invention, the precipitating crystalline phases have body-centered cubic crystalline structure.

Another measurement of the processability of amorphous alloys can be described by defining a ΔTsc (super-cooled liquid region), which is a relative measure of the stability of the viscous liquid regime of the alloy above the glass transition. ΔTsc is defined as the difference between Tx, the onset temperature of crystallization, and Tsc, the onset temperature of the super-cooled liquid region. These values can be conveniently determined using standard calorimetric techniques such as DSC measurements at 20° C./min. For the purposes of this disclosure, Tg, Tsc and Tx are determined from standard DSC (Differential Scanning Calorimetry) scans at 20° C./min. Tg is defined as the onset temperature of glass transition, Tsc is defined as the onset temperature of super-cooled liquid region, and Tx is defined as the onset temperature of crystallization. Other heating rates such as 40° C./min, or 10° C./min can also be utilized while the basic physics of this technique are still valid. All the temperature units are in ° C.

Generally, a larger ΔTsc is associated with a lower critical cooling rate, though a significant amount of scatter exists at ΔTsc values of more than 40° C. Bulk-solidifying amorphous alloys with a ΔTsc of more than 40° C., and preferably more than 60° C., and still more preferably a ΔTsc of 90° C. and more are very desirable because of the relative ease of fabrication.

Figure 1B:
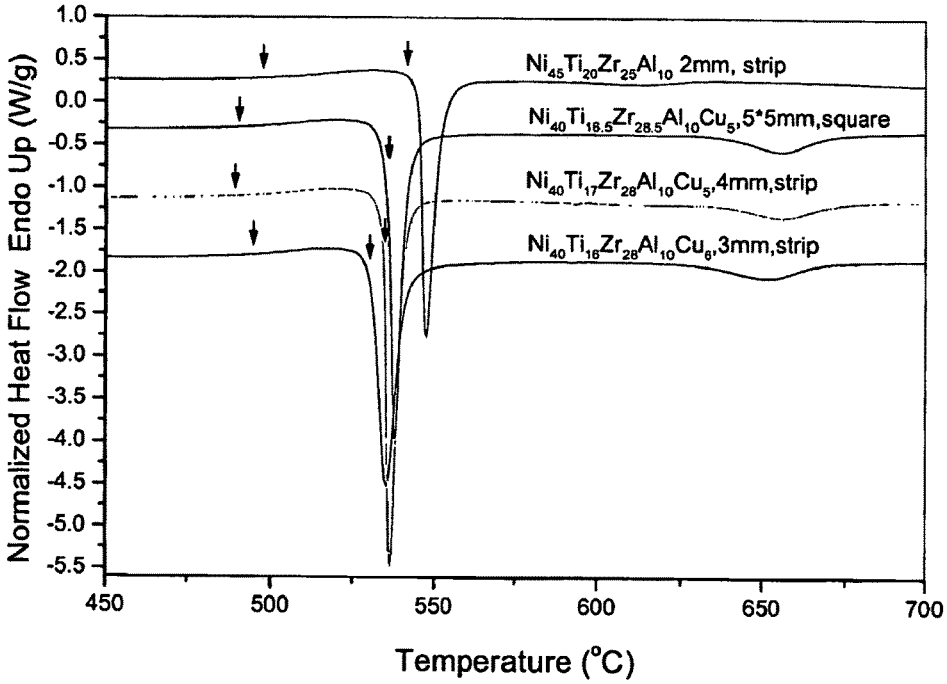
FIG. 1b is a graphical depiction of differential scanning calorimetry (DSC) plots of an exemplary bulk amorphous alloy.

Typical examples of DSC scans for fully amorphous strips are given in FIG. 1b. The vertical arrows in FIG. 1b indicate the location of the observed glass transition and the observed crystallization temperature of an exemplary alloy which was cast up to 5 mm thick amorphous strips. Further, Table 2, below gives the measured glass transition temperature and crystallization temperatures obtained for the alloys using Differential Scanning Calorimetry scans at heating rates of 10-20 K/s. The difference between Tg and Tx, ΔT=Tx−Tg, is measure of the temperature range over which the super-cooled liquid is stable against crystallization when the glass is heated above Tg. The value of ΔT is a measure of the "processability" of the amorphous material upon subsequent heating. Values of this parameter are also given in Table 2, as reported values ranging up to ΔT~50 K are observed.

TABLE 2

| Alloy Composition (Atomic %) | Critical Casting Thickness | Tg (K) | Tx (K) | ΔT (K) |
|---|---|---|---|---|
| $Ni_{45}Ti_{20}Zr_{35}$ | 0.5 | 725 | 752 | 27 |
| $Ni_{45}Ti_{20}Zr_{27}Al_{8}$ | <0.5 | 761 | 802 | 41 |
| $Ni_{45}Ti_{20}Zr_{25}Al_{10}$ | 2 | 773 | 818 | 45 |
| $Ni_{45}Ti_{20}Zr_{23}Al_{12}$ | <0.5 | 783 | 832 | 49 |
| $Ni_{40}Ti_{16}Zr_{28}Al_{10}Cu_{6}$ | 3.5 | 766 | 803 | 42 |
| $Ni_{40}Ti_{17}Zr_{28}Al_{10}Cu_{5}$ | 4 | 762 | 808 | 46 |
| $Ni_{40.5}Ti_{16.5}Zr_{28}Al_{10}Cu_{5}$ | 4 | 764 | 809 | 45 |
| $Ni_{40}Ti_{16.5}Zr_{28.5}Al_{10}Cu_{5}$ | 5 | 763 | 809 | 46 |
| $Ni_{39.8}Ti_{15.92}Zr_{27.86}Al_{9.95}Cu_{5.97}Si_{0.5}$ | 5 | 768 | 815 | 47 |

To assess the strength and elastic properties of these new metallic glasses, we have carried out measurements of the Vickers Hardness and compression tests. Typical data are shown in Table 3, below. Typical values range from V.H.=700 to 900. Based on this data, and using empirical scaling rules, one can estimate the yield strength, Y.S. of these materials. Here we have used the approximate formula:

$$Y.S.=(V.H.)\times 3$$

where the approximate yield strength is given in MPa and the Vickers Hardness is given in $Kg/mm^2$. The yield strength values can be as high as 2.5 GPa and among the largest values of Y.S. of any bulk amorphous alloys reported to date.

Table 3 also gives values for Poisson ratio (ν), shear modulus (μ) and Young's modulus (E) of exemplary alloys. These elastic properties data were obtained by measuring the sound propagation velocities of plane waves (longitudinal and transverse, $C_1$ and $C_s$, respectively) in the alloys, then using the following relations (valid for isotropic materials such as amorphous alloys):

$$\nu=(2-x)/(2-2x)=\text{Poisson's ratio, where } x=(C_1/C_s)^2$$

$$\mu=\rho^* C_s^2=\text{shear modulus, where } \rho \text{ is density}$$

$$E=\mu^* 2(1+\nu)=\text{Young's modulus}$$

As can be seen from the data, the Young's modulus for these new bulk amorphous alloys is relatively large, i.e., these are relatively "stiff" bulk amorphous alloys.

TABLE 3

| Alloy Composition (Atomic %) | Vickers Hardness | Yield Strength (GPa) | Poisson's ratio | Shear Modulus (GPa) | Young Modulus (GPa) |
|---|---|---|---|---|---|
| $Ni_{45}Ti_{20}Zr_{25}Al_{10}$ | 791 | 2.37 | 0.36 | 42.7 | 116 |
| $Ni_{40}Ti_{16}Zr_{28}Al_{10}Cu_{6}$ | 780 | 2.2 | 0.361 | 41.5 | 113 |
| $Ni_{40}Ti_{17}Zr_{28}Al_{10}Cu_{5}$ | 862 | 2.3 | 0.348 | 50.1 | 135.1 |
| $Ni_{40.5}Ti_{16.5}Zr_{28}Al_{10}Cu_{5}$ | 787 | 2.36 | 0.36 | 42.5 | 115.5 |
| $Ni_{40}Ti_{16.5}Zr_{28.5}Al_{10}Cu_{5}$ | 800 | 2.4 | 0.355 | 45.6 | 123.7 |
| $Ni_{39.8}Ti_{15.92}Zr_{27.86}Al_{9.95}Cu_{5.97}Si_{0.5}$ | 829 | 2.49 | 0.36 | 43.5 | 118.2 |

In sum, the inventors discovered a new family of bulk metallic glass forming alloys having exceedingly high values of hardness, elastic modulus (E), yield strength, and glass transition temperature, Tg. The values of these characteristic properties are among the highest reported for any known metallic alloys which form bulk metallic glass. Here, "bulk" is taken to mean that the alloys have a critical casting thickness of the order of 0.5 mm or more. The properties of these new alloys make them ideal candidates for many engineering applications.

Although specific embodiments are disclosed herein, it is expected that persons skilled in the art can and will design alternative Ni-based alloys that are within the scope of the following claims either literally or under the Doctrine of Equivalents.

What is claimed is:

1. A glass forming alloy consisting of an alloy having a composition given by:

$Ni_{100-a-b-c-d}$ $Ti_aZr_bAl_cCu_d$, where 15<a<18, 27<b<30, 9<c<11, 3<d<7.

2. The glass forming alloy described in claim 1 wherein the alloy has a ΔTsc of more than 40° C.

3. The glass forming alloy described in claim 1 wherein the alloy has a Vickers hardness greater than 700 $Kg/mm^2$.

4. The glass forming alloy described in claim 1 wherein the alloy has a yield strength of greater than 2.5 GPa.

5. The glass forming alloy described in claim 1 wherein the alloy has a Young's modulus of greater than 140 GPa.

6. The glass forming alloy described in claim 1 wherein the alloy has a ratio of glass transition temperature to liquidus temperature of around 0.6 or more.

7. The glass forming alloy described in claim 1 wherein the alloy is substantially amorphous.

8. The glass forming alloy described in claim 1 wherein the alloy contains a ductile crystalline phase precipitate.

9. The glass forming alloy described in claim 1 wherein the critical cooling rate is less than about 1,000° C./sec.

10. A glass forming alloy consisting of an alloy having a composition given by:

[$Ni_{100-a-b-c-d}Ti_aZr_bAl_cCU_d$] $Ni_{100-a-b-c-d}Ti_aZr_bAl_cCu_d$, where 15<a<18, 27<b<30, 9<c<11, 3<d<7, and a+b+c+d is in the range of from 58 to 61.

11. The glass forming alloy described in claim 10 wherein the critical cooling rate is less than about 1,000° C./sec.

12. A three dimensional article made from the alloy of claim 1 having an amorphous phase.

13. A three dimensional article made from the alloy of claim 10 having an amorphous phase.

14. The glass forming alloy of claim 1 having a composition of $Ni_{40}Ti_{16}Zr_{28}Al_{10}Cu_{6}$.

15. The glass forming alloy of claim 1 having a composition of $Ni_{40}Ti_{17}Zr_{28}Al_{10}Cu_{5}$.

*16. A Ni-based glass forming alloy consisting of Ni, Ti, Zr, and Al, wherein a critical casting thickness of the glass forming alloy is 2 mm or more, wherein a content of Al is about 8 to about 17 atomic percent, wherein the critical casting thickness is a maximum thickness for which fully amorphous strips are obtained by metal mold casting.*

*17. The Ni-based glass forming alloy of claim 16, wherein the atomic percent of Al is greater than 8 and less than 12.*

*18. The Ni-based glass forming alloy of claim 16, wherein a content of Zr is about 25 to about 37 atomic percent.*

*19. The Ni-based glass forming alloy of claim 16, wherein a content of Zr is 29 to about 37 atomic percent, wherein the Ni-based glass forming alloy is a bulk amorphous alloy.*

*20. A Ni-based glass forming alloy consisting of Ni, Ti, Zr, Al, TM, ETM and AM, given by the formula:*

$$(Ni_{1-x}TM_x)_a((TiZr)_{1-y}ETM_y)_b(Al_{1-z}AM_z)_c$$

*wherein a is in the range of from 37-49, b is in the range of 38 to 52, c is in the range of 8 to 12 atomic percentages; wherein ETM is a metal selected from the group consisting of Hf, Nb, Ta, V, Cr, Mo, and W, TM is a transition metal selected from the group of Cu, Co, Fe, Mn, and AM is an additive material selected from the group of*

*Si, Sn, Ge, B, Sb and wherein x is less than 0.2, y is less than 0.2, z is less than about 0.3 and the content of Ti is more than 13 atomic percent and the Zr content is more than 30 atomic percent and wherein a critical casting thickness of the glass forming alloy is 0.5 mm or more.*

* * * * *